United States Patent [19]

Asars

[11] 4,087,792
[45] May 2, 1978

[54] ELECTRO-OPTIC DISPLAY SYSTEM

[75] Inventor: Juris A. Asars, Murrysville, Pa.

[73] Assignee: Westinghouse Electric Corp., Pittsburgh, Pa.

[21] Appl. No.: 773,874

[22] Filed: Mar. 3, 1977

[51] Int. Cl.² .................. G08B 5/36; H05B 33/08
[52] U.S. Cl. .............. 340/166 EL; 315/169 TV; 340/324 M
[58] Field of Search ........ 340/166 EL, 324 M, 173.2; 315/169 TV; 358/59

[56] References Cited

U.S. PATENT DOCUMENTS

| | | | |
|---|---|---|---|
| 3,765,011 | 10/1973 | Sawyer et al. | 340/166 EL |
| 3,940,757 | 2/1976 | Purchase | 340/166 EL |
| 3,990,057 | 11/1976 | Kumada | 340/173.2 |
| 4,006,383 | 2/1977 | Luo et al. | 340/166 EL |
| 4,021,798 | 5/1977 | Kojima et al. | 340/166 EL |

*Primary Examiner*—Donald J. Yusko
*Attorney, Agent, or Firm*—W. G. Sutcliff

[57] ABSTRACT

An electro-optic display system is detailed in which an electro-optic display panel is driven by varying the on-time duty cycle during which the display medium is excited to generate the grey-scale brightness for an individual display element.

3 Claims, 5 Drawing Figures

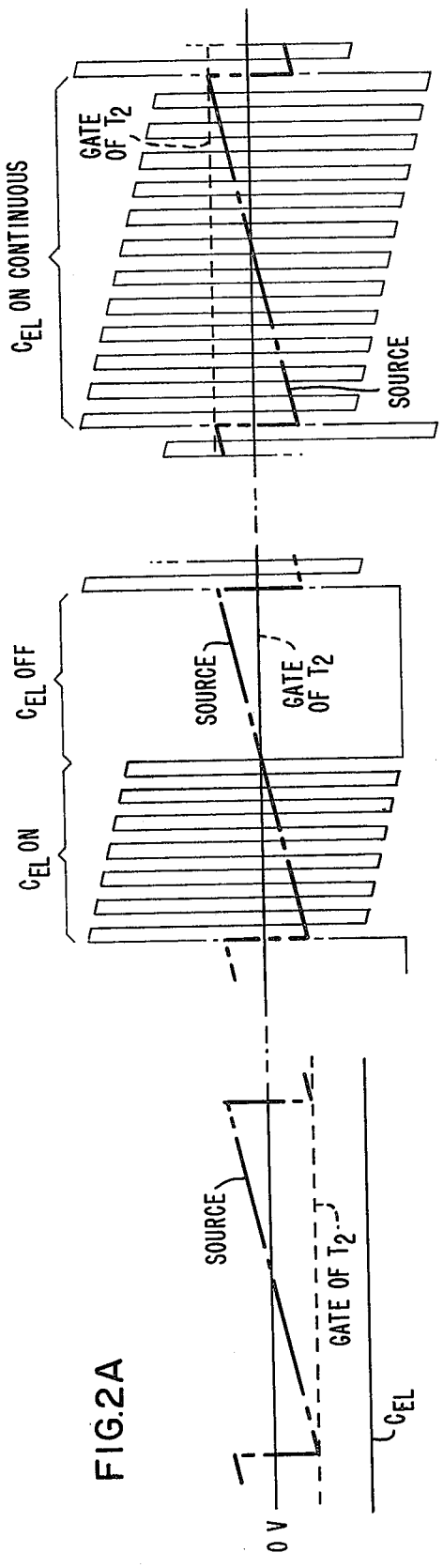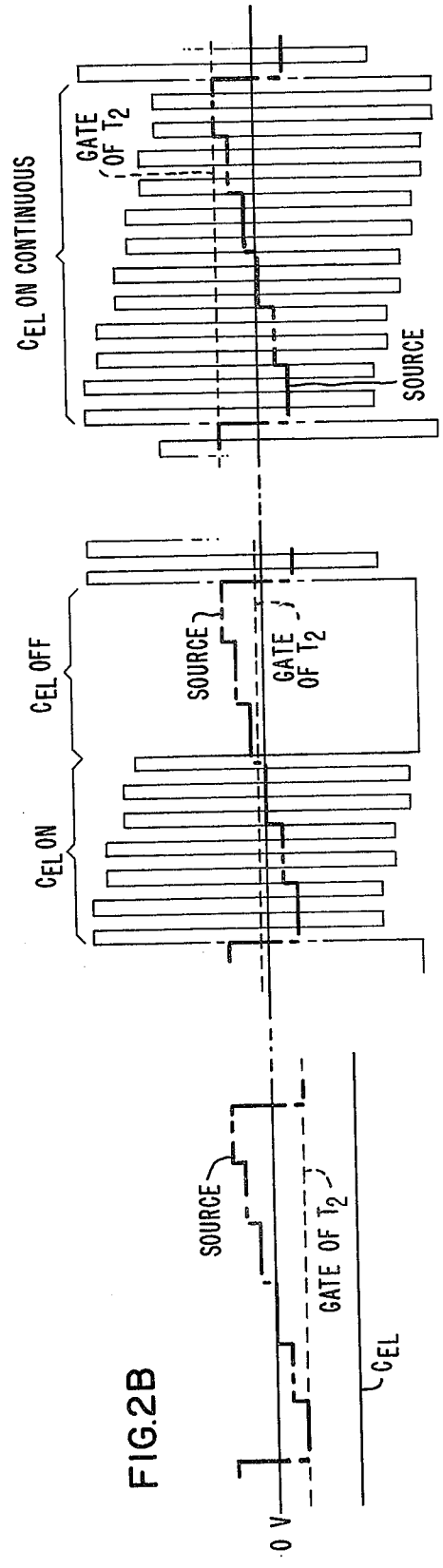

ELECTRO-OPTIC DISPLAY SYSTEM

BACKGROUND OF THE INVENTION

The present invention is related to flat panel electro-optic display systems, and more particularly to an improved panel electrical circuit structure and drive system for exciting individual display elements to the desired brightness.

A thin film transistor controlled flat panel electro-optic display panel is described in IEEE Transactions On Electron Devices, September, 1975. The display medium described therein is an electroluminescent (EL) phosphor. The display panel comprises an array of individually controllable display elements. A thin film transistor control circuit is associated with each display element, with the display element and circuitry interconnected by X—Y buses, which permit peripheral addressing. In such earlier display panels, at least two buses were used in either the horizontal or vertical direction to permit a reference level connection or return path for the individual EL display element. The brightness of the individual EL display element was controlled by varying the amplitude of the information signal potential which was applied to the gate of a drive signal switching transistor. The conductance of this transistor and the resultant current amplitude through the EL display medium was controlled as a direct function of the information signal amplitude. This drive and control system places a stringent requirement on the thin film transistor threshold uniformity and stability across the display panel for accurate grey scale display. A typical panel would have thousands of display elements and transistors. The drive system also requires a higher than desired power dissipation at intermediate brightness. This is because the current flow in the drive control transistor is in phase with the excitation voltage across it. Low power dissipation is a key to portability and versatility of the lightweight display panel since it reduces the size and weight of the power pack required.

The present invention involves a change in the display panel circuitry and in the drive system. Power dissipation is eliminated in the ideal case by transferring brightness control from the current amplitude to the duty cycle or on-time domain. The threshold sensitivity requirement is reduced by lowering the effective gain of the control transistor.

SUMMARY OF THE INVENTION

An electro-optic display panel in which rows and columns of individual display elements are defined between and interconnected by row and column signal buses. Individual transistor control circuitry is associated with each display element. The transistor control circuitry comprises an information signal switching transistor, an information signal storage capacitor, and a display element drive signal control transistor. A common bus bar connects together the source contacts of all the drive signal control transistors, and the common bus is connectable to variable potential means. The brightness of an individual display element is then a function of the time which the stored information signal exceeds a variable potential applied to the source contact of the drive signal control transistor.

BRIEF DESCRIPTION OF THE DRAWINGS

FIGS. 2A and 2B illustrate the drive system waveforms per the present invention.

In FIG. 2A a ramp signal source potential waveform is applied, and the three modes from left to right are display element off, partial-on, and full-on.

In FIG. 2B a different ramp signal source potential is shown again with the display element in three modes from left to right of off, partial-on, full-on.

DESCRIPTION OF THE PREFERRED EMBODIMENT

Figure 1:
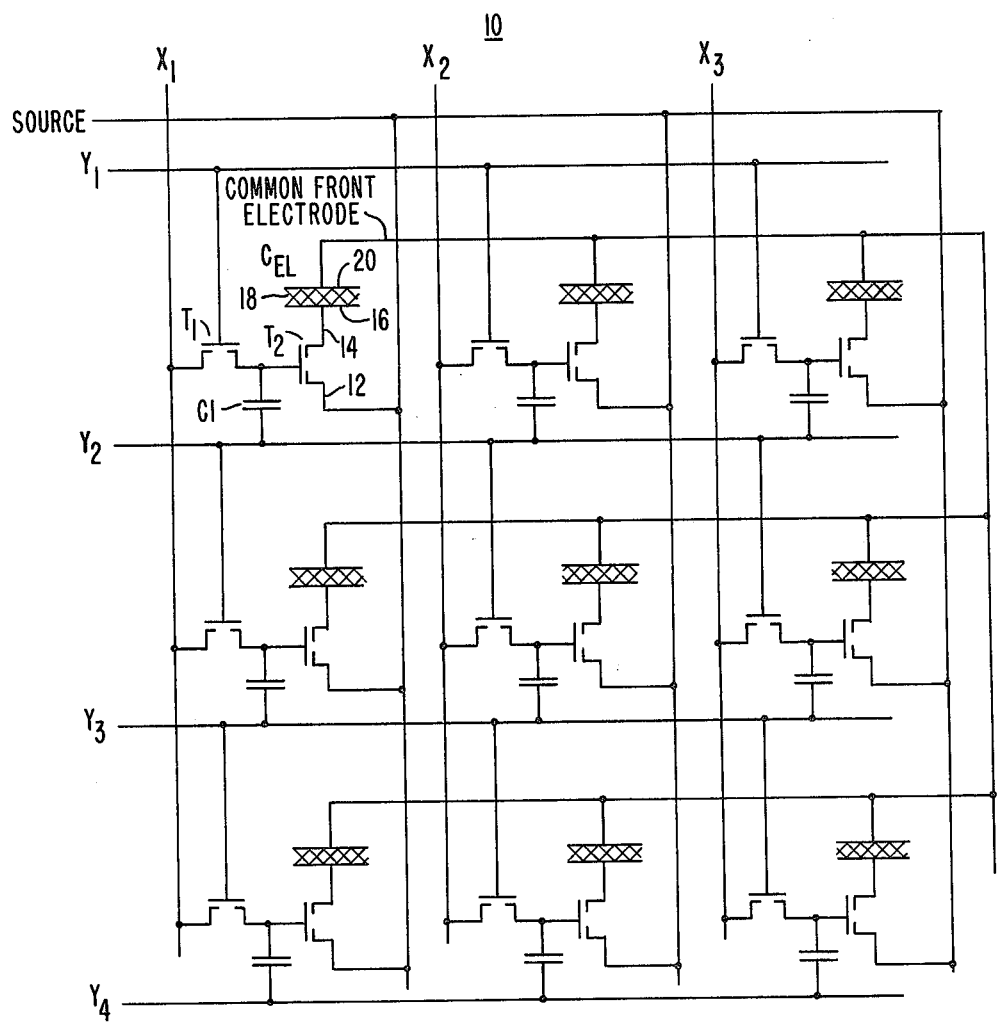
FIG. 1 is a circuit schematic representation of a portion of the electro-optic display panel of the present invention.

A small portion of an electro-optic display panel 10 is seen in FIG. 1, with a three-by-three array of electro-optic display elements. The $X_1$, $X_2$, $X_3$ bus leads are connected to an information signal source not shown. The $Y_1$, $Y_2$, $Y_3$, $Y_4$ bus leads are connected to a switching signal surce, not shown, which is synchronized with the information signal to permit addressing the desired display element. The source bus lead S connects together all the source contacts 12 of the drive signal control transistors $T_2$. The drain 14 of $T_2$ is connected to a planar metal electrode 16 upon which is disposed a layer of electroluminescent EL material 18 which is the electro-optic material. The other electrode 20 is parallel to electrode 16 and the EL material is disposed between electrodes 16 and 20 to form the display element $C_{EL}$. The electrode 20 is typically a thin metal light transmissive layer which covers the entire display panel over the plurality of display elements.

In the present display panel system the brightness information for a whole row of display elements is assembled on the column buses $X_i$. A positive switching pulse on the corresponding row bus $Y_j$ changes all transistors $T_1$ in the selected row from their normally nonconducting state to a low resistance state. This transfers the information or voltage levels from the column buses to the element storage capacitors $C_1$. At the termination of the pulse, the switching transistors $T_1$ return to the high resistance state and the voltage levels remain stored in the capacitors $C_1$ for a frame period. The normal or quiescent state potential of row buses $Y_j$ is utilized as common reference potential for the information distribution process. The common electrodes of the element storage capacitors in any given row are returned to the row bus of an adjacent row which is in the quiescent state during the switching pulse on the given row. With a low pulse duty cycle on each row bus, only an insignificant amount of light output will be generated by the switching pulse modulation of the control transistor $T_2$ gates. This effect can be eliminated by applying the switching pulse also to the sources of affected control transistors $T_2$ in a panel configuration where the source bus set runs parallel to the row buses. Synchronization between the electroluminescent excitation signal and the switching pules can also eliminate this minimum brightness threshold.

Figure 3A:
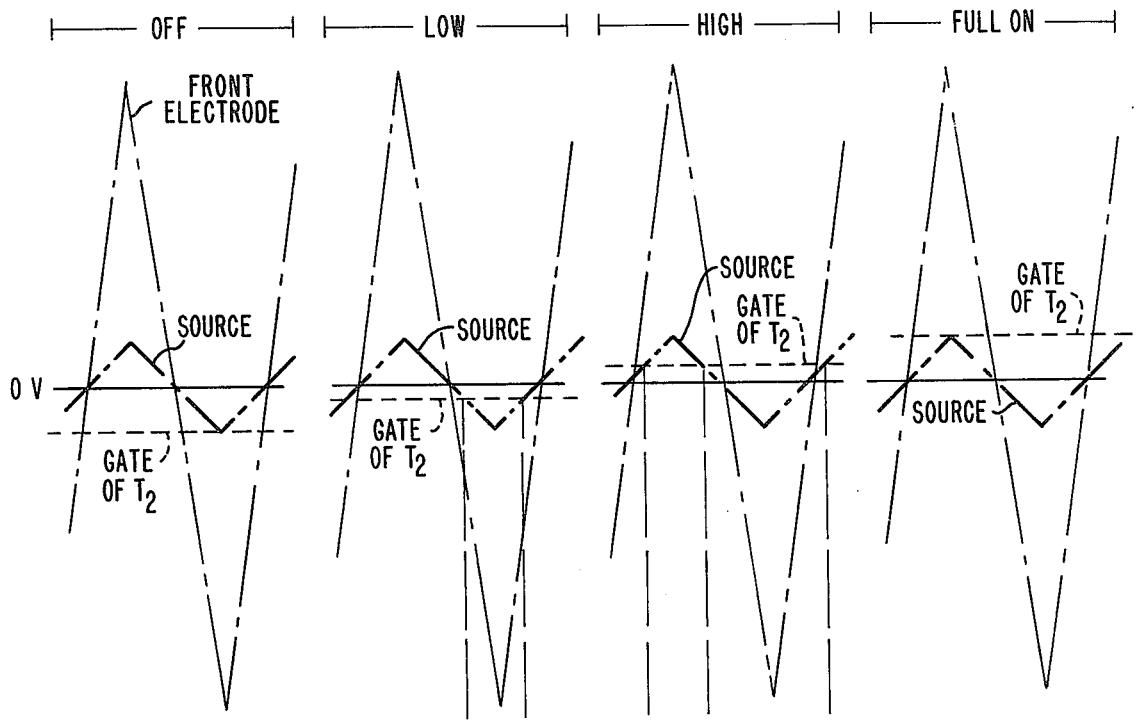
FIGS. 3A and 3B illustrate alternative drive system waveforms per the present invention with the source potential varied synchronously with electro-optic drive signal, with four modes shown from left to right.
Figure 3B:
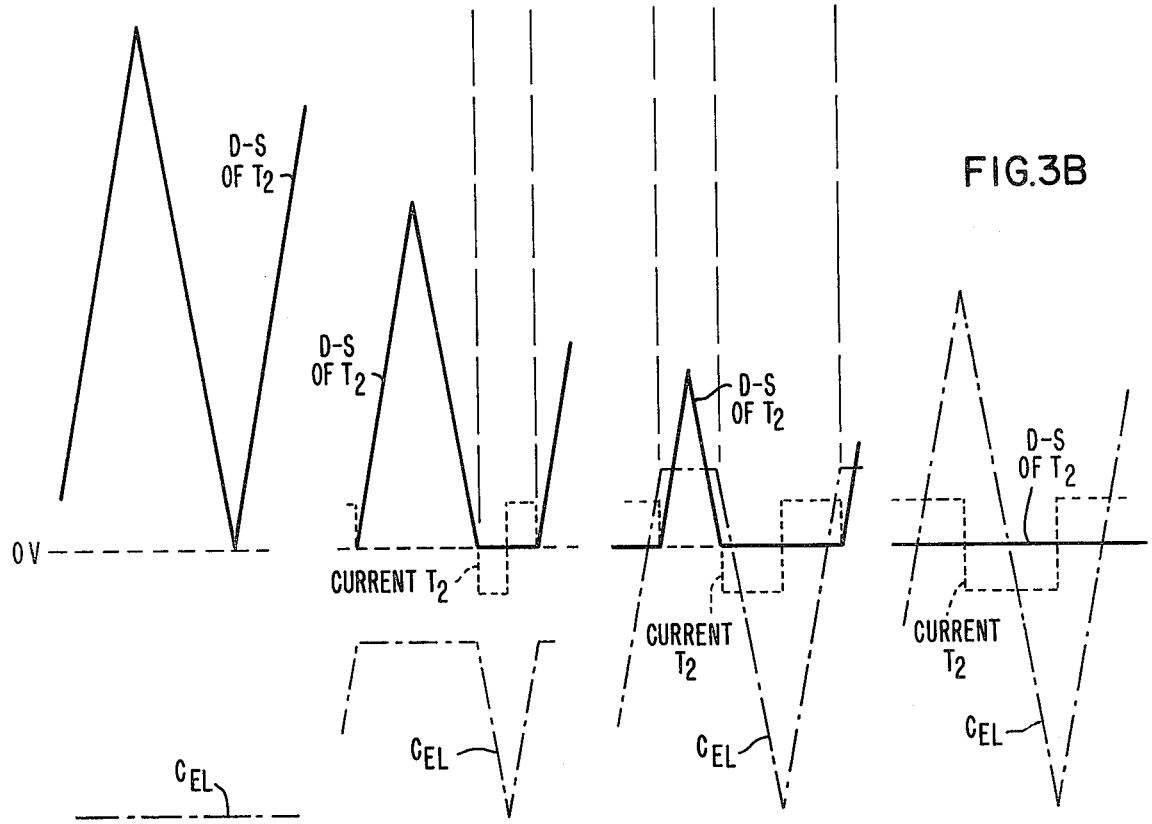

FIGS. 3A and 3B illustrate voltage and current waveforms applied to and existing across idealized elements in the present display panel. A variable conduction angle mode is shown at four brightness levels. In this operating mode the sources of all control transistors $T_2$ are modulated in synchronism with the electroluminescent cell excitation waveform. Both source and excitation waveforms at the top of the figure are shown as triangular only for convenience as almost any waveforms with finite rise and fall times can be utilized in this mode of operation. This illustration and the following description also assumes that the idealized thin film control transistor $T_2$ has negligible capacitance, zero threshold voltage and very high transconductance or gain. With these assumptions, for the "OFF" state the potential stored on the element storage capacitor $C_1$ is below the lowest instantaneous source potential as indicated at the top-left of FIG. 3A. The control transistor $T_2$ is in the nonconductive state and absorbs the entire electroluminescent excitation signal. Only a constant potential bias appears across the electroluminescent cell or capacitor $C_{EL}$ as indicated at bottom-left. For the "ON" state the potential stored on the capacitor is above the highest instantaneous source potential as indicated at top-right. The control transistor $T_2$ is continuously in the high conductance state and the entire excitation signal appears across the electroluminescent capacitor $C_{EL}$ as indicated at bottom-right. For the intermediate brightness states the gate potential of the control transistor $T_2$, stored on the element storage capacitor $C_1$, is between the minimum and maximum instantaneous common source potentials as indicated in the two center time intervals of FIG. 3A. The control transistor $T_2$ conducts only during a corresponding part of the excitation cycle and a portion of the excitation signal appears across the electroluminescent capacitor. In this case, the peak-to-peak signal across the electroluminescent capacitor is directly proportional to the information potential stored on the storage capacitor above its "OFF" value.

FIGS. 2A and 2B illustrate voltage waveforms in the same display panel circuit when it is operated in variable duty cycle modes. In the mode illustrated in FIG. 2A the light output from a display element is porportional to the stored information potential in a continuous manner. In the mode illustrated in FIG. 2B the potential stored on the element storage capacitor is quantized by the common source waveform and only discrete light output levels are possible. In both cases the same idealized component characteristics are assumed for FIG. 3A-3B operation. The source modulation frequency in these modes of operation is much lower than the electroluminescent excitation frequency with the lower limit determined by observable flicker (on the order of 50 Hertz). As before, for an element in the "OFF" state the potential on the element storage capacitor is lower than the minimum instantaneous source ramp potential. The control transistor $T_2$ is in the nonconducting state during the entire source cycle and only a bias potential appears across the electroluminescent capacitor. As the potential stored on the element storage capacitor is increased above the minimum instantanous source ramp potential the control transistor $T_2$ conducts during a corresponding portion of the source cycle. With the potential on the element storage capacitor at the maximum instantaneous source ramp potential, the control transistor remains in the low resistance state for the entire source cycle and the entire excitation signal appears across the electroluminescent cell. Both end points as well as an intermediate point on the brightness scale for this mode of operation are illustrated in FIGS. 2A-2B.

With idealized control transistor characteristics, all of the above modes of operation completely eliminate power dissipation in this transistor at intermediate brightness levels. With actual transistor characteristics the power dissipation in this circuit can be up to an order of magnitude lower than in the present one. Most of the dissipation in the control transistor will take place during the portion of time it spends between its full "ON" and "OFF" conduction states in each source cycle. This portion is determined by the gain of the transistor and the amplitude of the source signal. As the amplitude of the source signal is increased, the power dissipation in the display panel is reduced. An increased source signal amplitude also requires a larger range for brightness information signals on the column buses $X_i$ because their range is equal to the sum of the peak-to-peak source signal and the dynamic gate signal range of the control transistor. This effective attenuation of the brightness information signal also reduces the stability and uniformity requirements for the control transistor. A spatial or temporal threshold voltage change is divided by the time derivative of the source potential to obtain its effect on the conduction phase angle or duty cycle for the control transistor. For display systems where discrete multi-level brightness levels are desirable a staircase source signal can be utilized as indicated for FIG. 2B. In this mode, the time derivative of the source potential becomes very large over a number of limited regions and threshold variations within one step do not affect the output brightness. Similar quantization can be applied to the phase angle mode illustrated in FIG. 3A-3B.

I claim:

1. In an electro-optic display panel in which rows and columns of individual display elements are defined between and interconnected by row and column signal buses with individual transistor control circuitry associated with each individual display element, wherein the transistor control circuitry comprises an information signal switching transistor, an information signal storage capacitor, and a display element drive signal control transistor, wherein a common bus bar connects together the sources of all the display element drive signal transistors of the individual control circuits, which common bus bar is connectable to variable potential means such that the brightness of an individual display element is a function of the time which the stored information signal exceeds the variable potential applied to the source of the drive signal control transistor.

2. The display panel set forth in claim 1, wherein the source of the information signal switching transistor is connected to an information signal column bus and the gate thereof is connected to a switching signal row bus, with the information signal switching transistor drain connected to the information signal storage capacitor and to the gate of the display element drive signal control transistor, with the drain of the drive signal control transistor connected to the display element which is an electroluminescent phosphor layer disposed between two electrodes, one electrode connected to the drive signal control transistor drain, and the other electrode connected to drive signal means.

3. An electro-optic display system comprising:
    (a) an electro-optic display panel in which an array of rows and columns of individual electro-optic display elements are defined between and interconnected by row and column signal buses with individual transistor control circuitry associated with each individual display element, wherein the transistor control circuitry comprises an information signal switching transistor, an information signal storage capacitor, and a display element drive signal control transistor, wherein a common bus bar connects together the source contacts of all the display element drive signal control transistors of the individual control circuits;

(b) information signal means for sequentially providing information signals to the display panel via a row or column bus bar, which information signal is switched through the switching transistor and stored on the information signal storage capacitor connected to the gate of the display element drive signal control transistor;

(c) drive signal means for applying a drive signal potential to the display element, which display element is connected to the drain contact of the drive signal control transistor;

(d) drive signal control transistor source biasing means for applying a variable potential to the source of the drive signal control transistor such that the drive signal control transistor conducts when the source potential exceeds the stored information signal applied to the gate of the drive signal control transistor with the display element brightness being a function of the duty cycle on-time during which the stored information signal exceeds the potential on the drive signal control transistor source.

* * * * *